US012623186B2

(12) United States Patent　　　　　(10) Patent No.:　US 12,623,186 B2

Kornbluth et al.　　　　　　　　　　(45) Date of Patent:　　　May 12, 2026

(54) PROPANE GAS REMOVAL MATERIAL

(71) Applicant: Robert Bosch GmbH, Stuttgart (DE)

(72) Inventors: Mordechai Kornbluth, Brighton, MA (US); Soo Kim, Fremont, CA (US); Thomas Weil, Simmozheim (DE); Sebastian Martens, Boeblingen (DE); Fabian Schmid, Stuttgart (DE); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 682 days.

(21) Appl. No.: 17/678,297

(22) Filed: Feb. 23, 2022

(65) Prior Publication Data

US 2023/0264178 A1　　Aug. 24, 2023

(51) Int. Cl.
B01D 53/86　　　(2006.01)
B01D 53/72　　　(2006.01)
(Continued)

(52) U.S. Cl.
CPC ........... B01D 53/864 (2013.01); B01D 53/72 (2013.01); B01D 2251/30 (2013.01);
(Continued)

(58) Field of Classification Search
None
See application file for complete search history.

(56) References Cited

U.S. PATENT DOCUMENTS

| | | |
|---|---|---|
| 4,182,694 A | 1/1980 | Lauder |
| 6,160,162 A | 12/2000 | Karim et al. |

(Continued)

FOREIGN PATENT DOCUMENTS

| | | | | |
|---|---|---|---|---|
| DE | 102011116863 A1 * | 4/2013 | ............ | F25B 49/005 |
| DE | 102019114744 A1 * | 12/2020 | ............ | F25B 25/005 |
| JP | 2000028284 A * | 1/2000 | | |

OTHER PUBLICATIONS

Chen et al. Applied Catalysis B: Environmental 290 (2021) 119989. Available online Feb. 14, 2021. (Year: 2021).*

(Continued)

*Primary Examiner* — Jennifer A Leung

(74) *Attorney, Agent, or Firm* — BROOKS KUSHMAN P.C.

(57) ABSTRACT

A propane gas-utilizing system includes a housing having propane gas and a propane leakage prevention material having a catalyst, scavenger, and/or oxidizer of the propane gas arranged in the housing and including at least one of (a) an oxide material having at least one composition of formula (I): $Ru_{1-x}M_xO_2$ (I), where $0<x\leq0.1$ and M is Ag, K, Pt, Rh, or Ir, or (b) an oxide material having at least one composition of formula (II): $Co_{3-x}M_xO_4$ (II), where $0<x\leq0.3$, and M is Pd, Cu, or Sr, or (c) an oxide material having at least one composition of formula (III): $MM'_xO_y$ (III), where x is a stoichiometric ratio of M' to M, $0\leq x\leq1.5$, y is a stoichiometric ratio of O to M, $1\leq y\leq3$, M is an alkali metal, and M' (if x>0) is Y, Ce, Nb, Ta, La, Nd, Mn, Ag, Au, or Cr.

18 Claims, 8 Drawing Sheets

(51) Int. Cl.
  *F25B 49/00* (2006.01)
  *B01J 35/50* (2024.01)

(52) U.S. Cl.
  CPC .. *B01D 2251/304* (2013.01); *B01D 2251/306* (2013.01); *B01D 2255/102* (2013.01); *B01D 2255/1026* (2013.01); *B01D 2255/20746* (2013.01); *B01D 2257/7022* (2013.01); *B01J 35/50* (2024.01); *F25B 49/005* (2013.01); *F25B 2500/22* (2013.01)

(56) References Cited

U.S. PATENT DOCUMENTS

| | | |
|---|---|---|
| 7,226,574 B2 | 6/2007 | Long et al. |
| 2015/0274555 A1 | 10/2015 | Volkel et al. |
| 2020/0123027 A1 | 4/2020 | Kornbluth et al. |
| 2020/0145856 A1 | 5/2020 | Hellstrom |
| 2021/0198124 A1 | 7/2021 | Metzger et al. |

OTHER PUBLICATIONS

Zhang et al. Catalysis Today 384-386 (2022) 238-245. Available online Apr. 15, 2021. (Year: 2021).*

Rombi et al. Applied Surface Science 256 (2010) 5576-5580. Available online Jan. 4, 2010. (Year: 2010).* https://www.cdc.gov/niosh/idlh/74986.html, "Propane" May 1994.

Hu et al, "Hydrothermal synthesis of NiCeOx nanosheets and its application to the total oxidation of propane," Applied Catalysis B: Environmental, 225 (2018) 110-120.

Solsona et al., "Total oxidation of propane using nanocrystalline cobalt oxide and supported cobalt oxide catalysts," Applied Catalysis B: Environmental, 84 (2008) 176-184.

Ren et al., "Low temperature propane oxidation over Co3O4 based nano-array catalysts: Ni dopant effect, reaction mechanism and structural stability," Applied Catalysis B: Environmental, 180 (2016) 150-160.

Hu et al., "Total oxidation of propane over a Ru/CeO2 catalyst at low temperature," Environmental Science & Technology, 2018, 52, 9531-9541.

Merino et al., "La1-xCaxCoO3 perovskite-type oxides: preparation, characterisation, stability, and catalytic potentiality for the total oxidation of propane," Journal of Catalysis 231 (2005) 232-244.

Morales et al., "Total oxidation of ethanol and propane over Mn—Cu mixed oxide catalysts," Applied Catalysis B: Environmental 67 (2006) 229-236.

Urda et al., "Co and Ni ferrospinels as catalysts for propane total oxidation," Catalysis Communications 10 (2009) 1651-1655.

Kareem et al., "Catalytic oxidation of propane over palladium alloyed with gold: an assessment of the chemical and intermediate species," Catalysis Science and Technology, 2018, 8, pp. 6228-6240.

Gluhoi et al., "Total oxidation of propene and propane over gold-copper oxide on alumina catalysts Comparison with Pt/A1203" Catalysis Today 113 (2006) 178-181.

Sebti Elias et al, "Removal of Na+ and Ca2+ with Prussian blue analogue electrodes for brackish water desalination," Desalination, vol. 487, May 6, 2020, 114479.

International Search Report issued in PCT/EP2022/072644, dated Nov. 16, 2022. (5 pages).

* cited by examiner

PROPANE GAS REMOVAL MATERIAL

TECHNICAL FIELD

The present disclosure relates to materials to be utilized for propane oxidation and/or scavenging to prevent unwanted propane accumulation in a propane gas-utilizing device or system, a method of identifying the same, and methods of utilizing the same.

BACKGROUND

Heat pumps are an energy-efficient alternative to separate furnace and air-conditioning systems. Heat pumps use electricity to transfer heat from a cool space to a warm space, cooling the cool space even further and warming the warmer place even further. Some heat pumps utilize propane gas which, in time, may accumulate and pose a safety hazard due to propane's combustibility. The same risk may be experienced in additional propane-gas utilizing systems. It would be desirable to alleviate the risk.

SUMMARY

In an embodiment, a propane gas-utilizing system is disclosed. The system may include a housing including propane gas; a propane leakage prevention material comprising a catalyst, scavenger, and/or oxidizer of the propane gas arranged in the housing and including at least one of (a) an oxide material having at least one composition of formula (I):

$$Ru_{1-x}M_xO_2 \qquad (I),$$

where: 0<x≤0.1, and M is Ag, K, Pt, Rh, or Ir, or
(b) an oxide material having at least one composition of formula (II):

$$Co_{3-x}M_xO_4 \qquad (II),$$

where: 0<x≤0.3, and M is Pd, Cu, or Sr, or
(c) an oxide material having at least one composition of formula (III):

$$MM'_xO_y \qquad (III),$$

where: x is a stoichiometric ratio of M' to M, 0≤x≤1.5, y is a stoichiometric ratio of O to M, 1≤y≤3, M is an alkali metal, and M' (if x>0) is Y, Ce, Nb, Ta, La, Nd, Mn, Ag, Au, or Cr.

The material may be configured as a coating on at least one surface of the housing. The material may be a scavenger including at least one oxide of formula (II) or (III). The material may form a multi-layer coating, each layer having the same composition. The material may include an alkali oxide. M in the formula (I) or (III) may be K. The material may be structured as a replaceable component of the propane gas-utilizing system. The material may include at least one compound of the formula (III), where M' may be a transition metal and M is Na, K, Rb, or Cs.

In another embodiment, a propane gas catalyst is disclosed. The catalyst may include at least one of (a) an oxide material having at least one composition of formula (I):

$$Ru_{1-x}M_xO_2 \qquad (I),$$

where: 0<x≤0.1, and M is Ag, K, Pt, Rh, or Ir, or
(b) an oxide material having at least one composition of formula (II):

$$Co_{3-x}M_xO_4 \qquad (II),$$

where: 0<x≤0.3, and M is Pd, Cu, or Sr, or
(c) an oxide material having at least one composition of formula (III):

$$MM'_xO_y \qquad (III),$$

where: x is a stoichiometric ratio of M' to M, 0≤x≤1.5, y is a stoichiometric ratio of O to M, 1≤y≤3, M is Na, K, Rb, or Cs, and M' (if x>0) is Y, Ce, Nb, Ta, La, Nd, Mn, Ag, Au, or Cr, the catalyst may be configured to increase a rate of propane gas oxidation without being consumed in the reaction.

The catalyst may be a heat pump system propane gas catalyst. The catalyst may form a nanoparticle layer. The catalyst may include only oxides of the formula (I). The catalyst may be arranged as a multi-layer coating. Each layer of the multi-layer coating may include one or more compounds of the same formula (I), (II), or (III).

In yet another embodiment, a propane gas scavenger may include at least one of (a) an oxide material having at least one composition of formula (I):

$$Ru_{1-x}M_xO_2 \qquad (I),$$

where: 0<x≤0.1, and M is Ag, K, Pt, Rh, or Ir, or
(b) an oxide material having at least one composition of formula (II):

$$Co_{3-x}M_xO_4 \qquad (II),$$

where: 0<x≤0.3, and M is Pd, Cu, or Sr, or
(c) an oxide material having at least one composition of formula (III):

$$M_aM'_xO_y \qquad (III),$$

where: x is a stoichiometric ratio of M' to M, 0≤x≤1.5, y is a stoichiometric ratio of O to M, 1≤y≤3, M is an alkali metal, and M' (if x>0) is Y, Ce, Nb, Ta, La, Nd, Mn, Ag, Au, or Cr, the scavenger being configured to selectively react with the propane gas to convert the propane gas into a composition with a lower density than the propane gas.

The scavenger may be a heat pump system propane gas scavenger. The scavenger may be a replaceable component of the heat pump system. The scavenger may form a nanoparticle layer. The scavenger may include at least one compound of the formula (III), where M' may be a transition metal. The scavenger may include a mixture of compounds of the formulas (II) and (III).

DETAILED DESCRIPTION

Figure 1A:
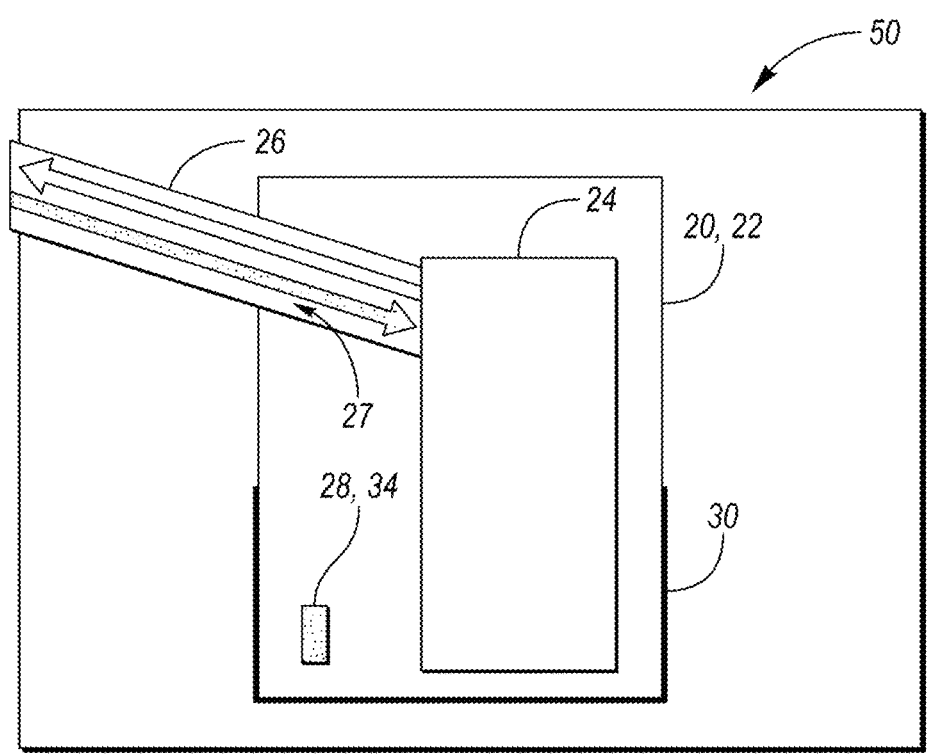
FIG. 1A-1C show non-limiting examples of heat pump systems incorporating the material disclosed herein.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures. The terms "compound" and "composition" are used interchangeably.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Heat pumps are devices or systems which can substitute a furnace and an air-conditioner in virtually any climate. Heat pumps do not generate heat, but transfer heat. Heat pumps are electric devices capable of transferring heat from a cool space to a warm space, resulting in an increased temperature in the warm space and reducing temperature in the cool space. During the heating season, heat pumps move heat from the cool outdoors into a house or building. During the cooling season, heat pumps move heat from a house or building into the outdoors.

There are several types of heat pumps connected by ducts: air-to-air, water source, and geothermal. Heat pumps collect heat from the air, water, or ground outside a house and transfer it inside the house. Other types of heat pumps include duct-free heat pumps.

Heat pumps are considered quite efficient; a typical air-source heat pump may reduce an electricity use for heating of a single household by about 50% compared to a typical forced air furnace or baseboard heater. Another advantage of a heat pump lies in the ability to efficiently dehumidify the air, thus resulting in less energy use and more cooling comfort in the summer when compared to standard central air conditioning devices.

Traditional heat pumps use materials near a phase transition to transport heat from one area to another, e.g. outside to inside during the winter. To reduce environmental impact, some applications require simple hydrocarbons such as propane which are operated near the liquid-gas transformation. Propane is a gas with the molecular formula $C_3H_8$ which has become commercially available more than 100 years ago. It is a gas at standard temperature and pressure, but compressible to a transportable liquid. Propane is denser than air. The density of propane gas at 25° C. (77° F.) is 1.808 $kg/m^3$, about 1.5× the density of air at the same temperature. The density of liquid propane at 25° C. (77° F.) is 0.493 $g/cm^3$, which is equivalent to 4.11 pounds per U.S. liquid gallon, or 493 g/L. Propane expands at 1.5% per 10° F. Thus, liquid propane has a density of approximately 4.2 pounds per gallon (504 g/L) at 60° F. (15.6° C.).

Propane use poses a risk. Propane may accumulate in gravitationally low spaces such as near the floor in buildings. Propane is commonly stored under pressure at room temperature in a tank. If there are any leaks in the tank, the vaporized gas will tend to sink into any enclosed area, and could potentially accumulate in one location, which would create a combustion hazard. The risk of an explosion and fire is greater if the propane-using device is below ground grade, where due to the density of propane, the three-carbon alkane gas is unlikely to move outside the building and rather will accumulate.

As an example, a heat pump may emit 3-20 grams of propane per year. For a utility-cellar volume as small as 10 cubic meters (12.75 kg air), propane accumulation would be up to about 1500 ppm/year. For reference, the lower explosive limit (LEL) and hence safety limit of propane is 2100 ppm at room temperature.

Besides heat pumps, propane is used in other systems and devices such as portable stoves and grills, as a refrigerant, fuel in industrial as well as domestic applications, as a motor fuel, shipping fuel, in blowtorches, hot air balloon fuel, etc.

The combustion hazard of propane has been recognized, and a number of catalyst materials that can dehydrogenate propane have been identified in literature. A typical approach of vaporized propane explosion focuses on increasing selectivity to dehydrogenate propane and to produce propene more selectively. A known catalyst is, for example, ruthenium oxide ($RuO_2$). Ruthenium is a rare transition metal and a platinum group metal. Ruthenium is also one of the most expensive metals in the world. Its availability is thus limited. Another known catalyst is cobalt tetraoxide ($Co_3O_4$). To enhance $Co_3O_4$ performance, Ni or other elemental doping is typically used, which increases price. Additionally, due to the popular use of $Co_3O_4$ in battery cathodes, the price of $Co_3O_4$ is expected to increase.

Therefore, it would be desirable to identify additional reliable low-cost materials and/or methods of preventing hazards associated with propane leaks, especially below ground level. It would be also desirable to identify a material which would last long term such as a life term of a heat pump, or another propane-utilizing device, at least 10 to 20 years.

In one or more embodiments, a material is disclosed. The material includes a propane gas catalyst, propane gas scavenger, propane gas oxidizer, or a combination thereof. The material may be incorporated in a propane application. A non-limiting example application may be a propane gas-utilizing device or system. A heat pump is a non-limiting example only, and other systems and devices, further discussed herein, are contemplated. The device or system may be in an underground level or below the ground level of a house, building, or structure such as a heat pump.

FIG. 1A shows a schematic of a non-limiting example of a heat pump or heat pump system 20 and its installation in a cellar or basement 50 of a house or building. The heat pump 20 has a housing 22 structured to include individual components of the heat pump 20. The housing 22 may include a refrigerant circuit 24, a ventilation/exhaust duct 26 via which the exhaust gas 27 enters and/or exits the cellar or basement 50, and a gas seal 30. The housing 22 may further include additional pipes, plumbing, connectors, tubes structured to bring the propane gas to the housing 22. The heat pump system 20 may further include a source of propane such as an inlet of propane gas or a propane gas tank. The housing 22 further includes the disclosed material 28 as a separate component, a coating, a layer on one or more surfaces of the housing, a part outside of the housing such as a plumbing tube, individual components of the heat pump, and/or the basement surfaces.

The material 28, also designated as material X, may be adapted (a) to catalyze propane gas oxidation reaction and return to its natural state X to oxidize additional amounts of propane after the oxidation reaction ended. The material 28 may be adapted to (b) scavenge reactions, where the material X selectively reacts with the propane gas, is converted into a secondary material that includes the propane, preventing accumulation of propane in the air. The material 28 may be adapted to (c) contain such a high excess of oxygen that the material oxidizes propane by reducing itself and creates carbon dioxide; it is a consumable of this reaction. The (c) oxidizer may be categorized as a scavenger since the material is consumed during the reaction.

The heat pump system 20, or another propane gas-utilizing system, implementing the material disclosed herein, may include an optional heat source 32. A non-limiting heat source 32 may be a battery-operated resistive heater. The heat source 32 may improve catalytic activity of the material since an elevated temperature of about 100-300, 120-280, or 150 to 250° C. may enhance propane conversion into $CO_2$ and/or other "lighter" products. The heat source 32 assists with controlling the rate of the reaction. The degree of heat may be adjustable to improve reaction rate without approaching the ignition point of propane. The term "lighter" products refers to any chemical species with a lower density than propane which may safely dissipate into the atmosphere in contrast to accumulating below grade level, the heat pump system 20, the basement 50, or a combination thereof. The "lighter" products do not sink to bottom level or floor, do not accumulate. Instead, the "lighter" products" are led out of the system, for example via the ventilation/exhaust duct 26.

Additionally, during operation of the heat pump 20 or another propane gas-utilizing system, the material remains below the ignition point of propane. The propane ignition temperature in air is 493 to 549° C. (920 to 1020° F.). The material may be chosen such that the system is free of a reaction with the highest spontaneity (free energy of reaction) to avoid creation of extra heat which could increase the risk of ignition. To further lower a risk of ignition, the material may include one or more heat-dispersing and/or heat-dissipating additives. Non-limiting examples may include one or more thermal heat sinks, cooling fins, or the like.

Table 1 below generally summarizes the reactions of the material X (a)-(c) with propane gas.

TABLE 1

| Reaction principles of the material X (a) – (c) with propane gas | |
| --- | --- |
| Reaction | Description |
| $X + C_3H_8 + 5O_2 \rightarrow$ $X + 4H_2O + 3CO_2$ | (a) Oxidation of propane with material X – a catalyst |
| $X + C_3H_8 \rightarrow XC_3H_8$ | (b) Scavenging reaction with material X – a scavenging material |
| $XO_{10} + C_3H_8 \rightarrow X +$ $4H_2O + 3\ CO_2$ | (c) Oxidizing reaction with material X – a strong oxidizer |

The material is designed such that spontaneous reactions with air, $CO_2$, and water vapor are minimized. Reactions with any of the air, $CO_2$, and water vapor may result in a shorter than desirable lifetime of the material. For example, since $CO_2$ will be one of oxidation products from propane, $CO_2$ reactivity of the material should be relatively low. Likewise, moisture or water vapor may be present in the environment of the heat pump, the material thus has a relatively low reactivity with the water vapor. The reactions are summarized in Table 2 below.

TABLE 2

| Undesirable reactions of the material X in the heat pump system | |
| --- | --- |
| Reaction | Description |
| $X + O_2 \rightarrow XO_2$ | Spontaneous reaction of material X in air |
| $X + CO_2 \rightarrow XCO_2$ | Spontaneous reaction of material X with carbon dioxide |
| $X + H_2O \rightarrow XH_2O$ | Spontaneous reaction of material X with water vapor |

The material may be structured to last in its catalytic, oxidizing, and/or scavenging capacity for at least 10 to about 20 years. Alternatively, the material may be structured to last a lesser amount of time and be included in the device or system in such capacity that the material is removable and replaceable, for example during a routine maintenance check/cycle (for example every year, 5 years, 10 years, or 15 years).

The material may include one or more materials/compounds of the formulas (I), (II), and/or (III). The materials/compounds of the formulas (I), (II), and/or (III) may be a catalyst, a scavenger, an oxidizer (a strong or super oxidizer), and/or a propane leakage preventive material arranged for propane capture, conversion, scavenging, oxidation, and/or catalysis. The material may be a propane leakage prevention material.

A catalyst refers to a material involved in a catalytic reaction. A catalyst may catalyze oxidation reaction of propane into "lighter" material(s), as defined herein, and return to its original state to oxidize additional amount of propane in time. A catalyst may not be consumed in the oxidizing reaction. A catalyst may work by providing a different pathway for the propane oxidation reaction, a pathway which has a lower activation energy than the uncatalyzed pathway. A catalyst may increase the rate of the propane oxidation reaction.

A scavenger may be converted into another material that includes the propane molecule upon reaction with propane gas. The scavenger may thus capture the propane molecule and form a third material with the propane, removing the propane from the system. The scavenger may be a consumable of the conversion reaction. The scavenger may selectively target the propane gas molecule.

An oxidizer or super oxidizer refers to a material containing excess of oxygen such that the material may oxidize propane by reducing itself and creating $CO_2$. The oxidizer may be a consumable of the oxidizing reaction, and may thus be considered a scavenger. The oxidizer may convert propane into propane oxide and water.

The material may include, comprise, consist of, or consist essentially of, one, one or more, or at least one composition or compound of the formula (I):

$$Ru_{1-x}M_xO_2 \tag{I}$$

where:
x may be any number between about 0 and 0.1, including 0.1,
M may be an element from the Period 4, 5, or 6 of the Periodic Table of Elements.

In the formula (I), x may be any number between 0 and 0.1. x may be about 0, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.10, or a range including any two of the disclosed numerals. A non-limiting example of the range may be about 0-0.1, 0.02-0.08, 0.03-0.07, or 0.04-0.06. x may be greater than 0 and smaller than or equal to 0.1 such that $0<x\leq0.1$. x may be greater than 0 and smaller than 0.1 such that $0<x<0.1$.

In formula (I), M may be an element from Period 4 of the Periodic Table of Elements and may include K; Period 5 of the Periodic Table of Elements and may include Rh, Ag, or Ru; or Period 6 of the Periodic Table of Elements and may include Pt or Ir. In formula (I), M may be from Group IA, IB, or VIIIB. In formula (I), M may be an alkali metal, precious metal, coinage metal, and/or transition metal. In formula (I), M may be an element selected from the group consisting of Ag, K, Pt, Rh, Ir, and Ru. In formula (I), M may be an element selected from the group consisting of Ag, K, Pt, Rh, and Ir. In formula (I), M may be one of Ag, K, Pt, Rh, Ir, and/or Ru. M may be Ag, K, Pt, Rh, Ir, or Ru.

Non-limiting examples of the oxides of formula (I) may include $Ru_{1-x}Ag_xO_2$, $Ru_{1-x}K_xO_2$, $Ru_{1-x}Pt_xO_2$, $Ru_{1-x}Rh_{1-x}O_2$, $Ru_{1-x}Ir_xO_2$, $Ru_{1-x}Ru_xO_2$, $Ag_{0.1}Ru_{0.9}O_2$, $K_{0.1}Ru_{0.9}O_2$, $Ru_{0.9}Pt_{0.1}O_2$, $Ir_{0.1}Ru_{0.9}O_2$, or $Ru_{0.9}Rh_{0.1}O_2$.

The material may include, comprise, consist of, or consist essentially of, one, one or more, or at least one composition or compound of the formula (II):

$$Co_{3-x}M_xO_4 \qquad\qquad (II),$$

where:

x may be any number between about 0 and 0.3, including 0.3,

M may be an element from the Period 4 or 5 of the Periodic Table of Elements.

In the formula (II), x may be any number between 0 and 0.3. x may be about 0, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.10, 0.105, 0.11, 0.115, 0.12, 0.125, 0.13, 0.135, 0.14, 0.145, 0.15, 0.155, 0.16, 0.165, 0.17, 0.175, 0.18, 0.185, 0.19, 0.195, 0.20, 0.21, 0.215, 0.22, 0.225, 0.23, 0.235, 0.24, 0.245, 0.25, 0.255, 0.26, 0.265, 0.27, 0.275, 0.28, 0.285, 0.29, 0.295, 0.30, or a range including any two of the disclosed numerals. A non-limiting example of the range may be about 0-0.3, 0.01-0.29, 0.05-0.25, or 0.07-0.20. x may be greater than 0 and smaller than or equal to 0.3 such that $0<x\leq0.3$. x may be greater than 0 and smaller than to 0.3 such that $0<x<0.3$.

In formula (II), M may be an element from Period 4 of the Periodic Table of Elements and may include Co, Ni, or Cu; or Period 5 of the Periodic Table of Elements and may include Sr or Pd. In formula (II), M may be from Group IA, IB, or VIIIB. In formula (II), M may be an alkaline earth metal, precious metal, transition metal, and/or a metal from the iron triad. In formula (II), M may be an element selected from the group consisting of Pd, Cu, Sr, Ni, and Co. In formula (II), M may be an element selected from the group consisting of Pd, Cu, Sr, or Ni. In formula (II), M may be one of Pd, Cu, Sr, Ni, and/or Co. M may be Pd, Cu, Sr, Ni, or Co.

Non-limiting examples of the oxides of formula (II) may include $Co_{3-x}Pd_xO_4$, $Co_{3-x}Cu_xO_4$, $Co_{3-x}Sr_xO_4$, $Co_{3-x}NiO_4$, $Co_{3-x}Co_xO_4$, $Co_{2.7}Pd_{0.3}O_4$, $Co_{2.7}Cu_{0.3}O_4$, $Sr_{0.3}Co_{2.7}O_4$, $Co_{2.8}Pd_{0.2}O_4$, $Co_{2.8}Ni_{0.2}O_4$, $Co_{2.8}Cu_{0.2}O_4$, $Sr_{0.2}Co_{2.8}O_4$.

The material may include, comprise, consist of, or consist essentially of one, one or more, or at least one composition or compound of the formula (III):

$$MM'_xO_y \text{ or } M_aM'_xO_y \qquad\qquad (III),$$

where:

a may be 1;

x may be any number between 0 and 1.5, including 0 and 1.5;

y may be any number between 1 and 3, including 1 and 3;

M may be an alkali metal;

M' may be an element from the Period 4, 5, or 6 of the Periodic Table of Elements.

In the formula (III), a may be 1. In the formula (III), a is 1.

In the formula (III), x may be the stoichiometric ratio of M' to M. In the formula (III), x may be any number between 0 and 1.5. x may be about 0, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.10, 0.105, 0.11, 0.115, 0.12, 0.125, 0.13, 0.135, 0.14, 0.145, 0.15, 0.155, 0.16, 0.165, 0.17, 0.175, 0.18, 0.185, 0.19, 0.195, 0.20, 0.21, 0.215, 0.22, 0.225, 0.23, 0.235, 0.24, 0.245, 0.25, 0.255, 0.26, 0.265, 0.27, 0.275, 0.28, 0.285, 0.29, 0.295, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, or a range including any two of the disclosed numerals. A non-limiting example of the range may be about 0-1.5, 0.01-1.4, 0.1-1.25, or 0.5-1.0.

x may be greater than or equal to 0 and smaller than or equal to 1.5 such that $0\leq x\leq1.5$. x may be greater than 0 and smaller than or equal to 1.5 such that $0<x\leq1.5$. x may be greater than or equal to 0 and smaller than 1.5 such that $0\leq x<1.5$. x may be greater than 0 and smaller than 1.5 such that $0<x<1.5$.

In the formula (III), y may be the stoichiometric ratio of O to M. In the formula (III), y may be any number between 1 and 3. x may be about 1.0, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19, 2.20, 2.21, 2.22, 2.23, 2.24, 2.25, 2.26, 2.27, 2.28, 2.29, 2.30, 2.31, 2.32, 2.33, 2.34, 2.35, 2.36, 2.37, 2.38, 2.39, 2.40, 2.41, 2.42, 2.43, 2.44, 2.45, 2.46, 2.47, 2.48, 2.49, 2.50, 2.51, 2.52, 2.53, 2.54, 2.55, 2.56, 2.57, 2.58, 2.59, 2.60, 2.61, 2.62, 2.63, 2.64, 2.65, 2.66, 2.67, 2.68, 2.69, 2.70, 2.71, 2.72, 2.73, 2.74, 2.75, 2.76, 2.77, 2.78, 2.79, 2.80, 2.81, 2.82, 2.83, 2.84, 2.85, 2.86, 2.87, 2.88, 2.89, 2.90, 2.91, 2.92, 2.93, 2.94, 2.95, 2.96, 2.97, 2.98, 2.99, 3.00, or a range including any two of the disclosed numerals. A non-limiting example of the range may be about 1.0-3.0, 1.1-2.8, 1.5-2.5, or 1.8-2.0.

y may be greater than or equal to 1 and smaller than or equal to 3 such that $1\leq y\leq3$. y may be greater than 1 and smaller than or equal to 3 such that $1<y\leq3$. y may be greater than or equal to 1 and smaller than 3 such that $1\leq y<3$. x may be greater than 0 and smaller than 3 such that $1<y<3$.

The total oxygen content $(y/y+1)$ may be between 0.5 and 0.75. The total oxygen content $(y/y+1)$ may be about 0.5-0.75, 0.55-0.72, or 0.58-0.70.

In formula (III), M may be an element from Period 3 of the Periodic Table of Elements and may include K; or Period 4 of the Periodic Table of Elements and may include K; from Period 5 of the Periodic Table of Elements and may include Rb; or from Period 6 of the Periodic Table of Elements and may include Cs. In formula (III), M may be from Group IA. In formula (III), M may be an alkali metal. In formula (III), M may be an element selected from the group consisting of Na, K, Rb, and Cs. In formula (III), M may be one of Na, K, Rb, or Cs. M may be Na, K, Rb, or Cs.

In formula (III), M' may be an element from Period 4 of the Periodic Table of Elements and may include Nb, Mn, or Cr; from Period 5 of the Periodic Table of Elements and may include Y, Rb, or Ag; or from Period 6 of the Periodic Table of Elements and may include Ta, La, Au, or Nd. In formula (III), M' may be from Group IB, IIIB, VB, VIB, or VIIB. In formula (III), M' may be a transition metal, precious metal, lanthanoid, and/or coinage metal. In formula (III), (if x>0), M' may be an element selected from the group consisting of Y, Ce, Nb, Ta, La, Nd, Mn, Ag, Au, and Cr. In formula (III), M' may be one of Y, Ce, Nb, Ta, La, Nd, Mn, Ag, Au, or Cr. M may be Y, Ce, Nb, Ta, La, Nd, Mn, Ag, Au, and/or Cr.

In formula (III), at least one or both of M and M' may be a metal.

Non-limiting examples of the oxides of formula (III) may include $K_aM'_xO_y$, $K_aMn_xO_y$, $K_aNb_xO_y$, $K_aTa_xO_y$, $Na_aM'_xO_y$, $Rb_aM'_xO_y$, $Rb_aMn_xO_y$, $Rb_aNd_xO_y$, $Rb_aLa_xO_y$, $NaO_2$, $KO_2$, $RbO_2$, $CsO_2$, $RbYO_2$, $K_2PtO_6$, $Rb_2CeO_3$, $K_3NbO_8$, $K_3TaO_8$, $Rb_3NbO_8$, $Rb_3TaO_8$, $Cs_3TaO_8$, $KMnO_4$, $RbLaO_2$, $RbNdO_2$, $RbMnO_4$, $CsMnO_4$, $Na_4(NiO_2)_9$, $KAgO_2$, $NaAgO_2$.

In the formula (III), due to the stoichiometric ratios x and y, the formulas may be written in more than one form. For example, $K_2PtO_6$ may be rewritten as $KPt_{0.5}O_3$, which is in the named ranges. Similarly, $Rb_3NbO_8$ may be rewritten as $RbNb_{0.33}O_{2.67}$, etc. Thus, in the non-limiting example formulas disclosed herein, where "a" is written as a value higher than 1, x and y may be divided by the value of "a" to arrive at the form of the formulas, where "a" is expressed as 1, and x and y are the stoichiometric ratio values. For example, $K_3NbO_8$ may be also written as $KNb_{0.33}O_{2.67}$ as x=1/3 and y=8/3.

In one or more embodiments, the material of formula (I) may be combined with the material of formula (II), (III), or both. In one or more embodiments, a propane gas-utilizing system, as described herein, may include one composition, at least one composition, or more than one composition of the material of formula (I), one composition, at least one composition, or more than one composition of the material of formula (II), and/or one composition, at least one composition, or more than one composition of the material of formula (III).

In a non-limiting example, the material may include at least one composition of the formula (I) including $K_{0.1}Ru_{0.9}O_2$, $Ag_{0.1}Ru_{0.9}O_2$, or both, combined with at least one composition of the formula (II) including $Co_{2.7}Cu_{0.3}O_4$, $Sr_{0.3}Co_2·7O_4$, or both. In addition, or alternatively, the material may include one or more compositions of the formula (III) including $NaO_2$, $KO_2$, $K_3NbO_8$, $K_3TaO_8$, or a combination thereof. Furthermore, depending on the priority of the application such as cost, reactivity, and/or stability, the material may be tailored from the compounds of the formula (I), (II), and/or (III), for example as disclosed in the Tables 3-9 in the Experimental Section below.

Additionally, the material may include at least one of a catalyst, a scavenger, or an oxidizer having a composition of the formula (I), (II), or (III). The material may include a combination of a catalyst, a scavenger, and/or oxidizer having a composition of the formula (I), (II), and/or (III). The material may include only one or more compounds of the formula (I), (II), and/or (III) which are arranged as a catalyst structured to convert propane in one or more compounds having a lower density than propane. The material may include only one or more compounds of the formula (I), (II), and/or (III) which are arranged as a scavenger structured to be converted into another compound including the propane. The material may include only one or more compounds of the formula (I), (II), and/or (III) which are arranged as a super oxidizer structured to oxidize propane by reducing itself and forming $CO_2$.

Figure 1B:
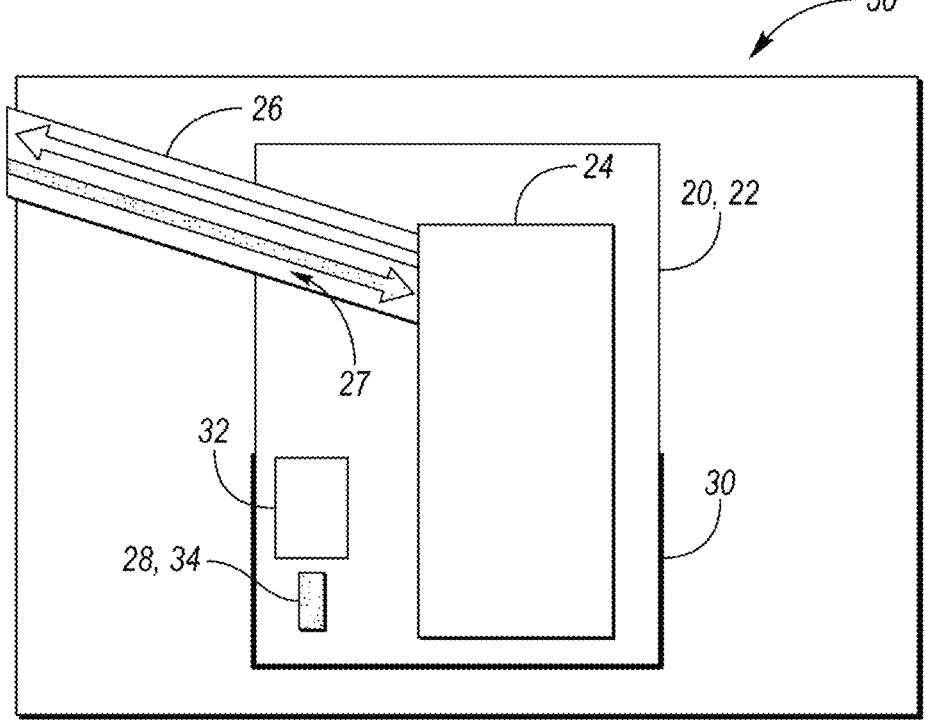

The material disclosed herein may be concentrated in a component such as component 34 shown in FIGS. 1A, 1B. The component 34 may have any size, shape, and configuration to be a catalyst, oxidizer, or scavenger for any propane gas which may have the capacity to escape the propane gas-utilizing system 20. The component 34 may be located anywhere within the system 20, the cellar or basement 50, or both. The component 34 may be located in the bottom portion of the housing 22 such that propane, which tends to sink to the floor due to its density, would encounter the component 34, and the material would prevent propane's accumulation in the system 20. The component 34 may include a layer or a bulk including one or more compositions of the material of the formula(s) (I), (II), and/or (III).

The component 34 may be a removable and/or replaceable component including the material. The material may be thus replaced, replenished, and/or exchanged during regular maintenance of the propane gas-utilizing system. This is especially true for the material which is converted during the scavenging reactions by reacting with propane, and amount of which would be lowered/consumed in time.

Figure 1C:
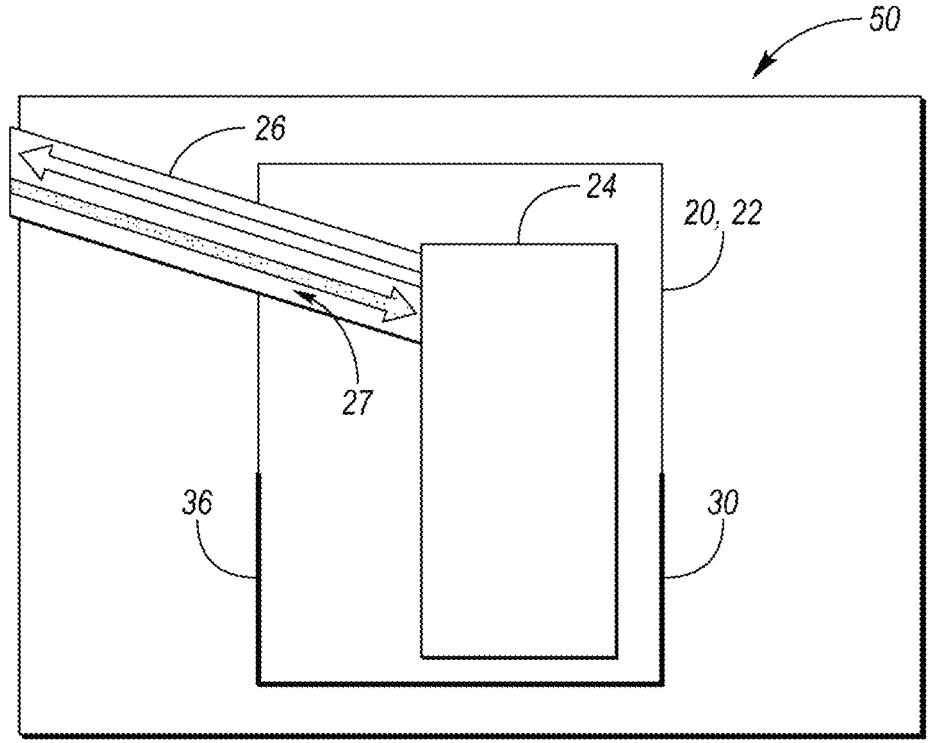

The material may be provided as a coating 36, as is shown in FIG. 1C. The coating 36 may have one or more layers. Each layer may have the same or different composition. For example, a first/top layer may include one or more compositions of the material of the formula(s) (I), (II), and/or (III). The second layer may include the same or different composition of the material of the formula(s) (I), (II), and/or (III). Additional layers are contemplated. Each additional layer of the coating 36 may include the same or different composition of the material of the formula(s) (I), (II), and/or (III) as the first and/or second layer.

The coating 36 may be a coating on any portions/surfaces of the propane gas-utilizing system, heat pump system 20, including, but not limited to, the ventilation/exhaust duct 26, housing 22 surface, refrigerant circuit 24 housing, gas seal 30, plumbing portion(s), the like, or a combination thereof. The coating 36 may be provided on a surface of the cellar or basement 50. The coating 36 may be limited to or applied only to any lower portions of the housing/basement where the propane gas tends to accumulate.

The material disclosed herein may be in a form of nanoparticles. The nanoparticles may have the same or different size, diameter, dimensions, orientation, structure, facets content, composition. The loading of the oxides of the formulas (I), (II), (III), or a combination thereof may be different or the same. It is contemplated that more than one layer including the oxides of the formulas (I), (II), (III), or a combination thereof may be formed. The layers may have the same or different architecture, loading of individual oxides, types of oxides, size of the oxide nanoparticles, the like, or a combination thereof. The form of the nanoparticles may increase surface area, and therefore reaction rate.

In a non-limiting example, the nanoparticles may have the size of about 10 nm and 1 μm (1000 nm), 50 nm to 0.75 μm (750 nm), or 100 nm to 0.5 μm (500 nm). The nanoparticles may have a size of about 10, 20, 30, 40, 50, 60, 70, 80, 90, 100, 125, 150, 175, 200, 225, 250, 275, 300, 325, 350, 375, 400, 425, 450, 475, 500, 520, 550, 575, 600, 625, 650, 675, 700, 725, 750, 775, 800, 825, 850, 875, 900, 925, 950, 975, or 1000 nm.

The oxide specie(s) may be deposited on to a designated support material(s) including, but not limited to, carbon, metal, ceramic, $CeO_2$, $AlO_x$, $TiO_x$, $MnO_x$ $NbO_x$, the like, or a combination thereof.

In addition to the example heat pump system disclosed herein, the material disclosed herein may be used in any propane gas-utilizing system such as another heat pump system, propane storage tank, propane heater, chemical engineering process producing propane as a by-product, or another application incorporating propane gas.

The oxides disclosed herein may be prepared by traditional methods known to those skilled in the art. For example, the oxides may be deposited using solution processes; these processes may include involving hydrate or hydroxide precursors and may include a baking step above about 50-100° C. The oxides may also be prepared using sputtering or plasma processes, or by high-temperature sintering above about 400-600° C. The oxides may also be prepared as a thin film coating using atomic layer deposition (ALD) or chemical vapor deposition (CVD).

The propane gas-utilizing system may have two modes or states. The system may include a first state in which propane gas is accumulating in the system. The system may be operating or switched off in the first state. The system may include a second state in which the disclosed material removes the accumulating or accumulated propane from the system. The second state may include the disclosed material catalyzing the accumulating or accumulated propane and returning to its natural state, scavenging the accumulating or accumulated propane by conversion into a secondary material including the propane molecule, and/or oxidizing the propane. The system may be operating or switched off in the second state.

In one or more embodiments, a method of using the material of the formulas (I), (II), and/or (III) is disclosed. The method may include preparing one or more compounds of the material of the formulas (I), (II), and/or (III). The method may include tailoring the material's composition based on a priority factor such as reactivity or cost. The method may include forming the material as a permanent or temporary application within a propane gas-utilizing system. For example, the method may include arranging the material as one or more layers, a single-layer coating, a multi-layer coating, a component. The method may include applying the material onto one or more surfaces of the propane gas-utilizing system, for example the housing surface, gas seal surface, plumbing surface, etc. The method may include providing the material as a separate component, and installing the component within the propane gas-utilizing system, for example near or onto a ground surface within the system. The method may include periodically or randomly checking, replacing, recharging, removing, reapplying, reinstalling the component, the coating, and/or the material within the system.

Experimental Section

The material disclosed herein was identified using density functional theory (DFT), which solves a system of electronic interactions for the ground-state energy of a material. Several databases of energies are available. To identify the disclosed material, the following steps were taken:

Total energy, which describes the computed energy of a structure (typically in eV/atom or eV) was computed. The differences between structures correspond to a reaction energy between those structures. For example, the reaction A→B has a reaction energy $E_B$–$E_A$ (where the energies might be written in kJ/mol).

The convex hull of all stable compositions was constructed such that each chemical composition C had a minimum combination of stable states, C→A+B, where the stoichiometric formula of C was equal to the sum of A and B, and there was no other A'+B' that had a lower energy. Then A+B represented the convex-hull decomposition products of C. If the energy of C was known, then the hull energy or decomposition energy (typically eV/atom or eV) was $E_h$=$E_C$–$E_A$–$E_B$ and was always a nonnegative number. In some conventions, it is reported as the reaction energy $E_{rxn}$=$E_A$+$E_B$–$E_C$ and is always a nonpositive number.

Chemical potential (also typically in eV/atom or eV) was identified, which describes the energy of an element whose stoichiometry is not balanced during a reaction. Chemical potential of oxygen or hydrogen is typically used, corresponding to an oxidative or reductive environment. Chemical potential can also be used as a proxy for temperature because high temperatures may accelerate oxidation.

The information regarding the total energy, convex-hull decomposition, and chemical potential was used to explore various classes of materials. The materials included any known materials whose DFT structure can be computed; typically single-crystal or gas-phase molecules, and compositional formulas, even if the atomic structure is not known, as long as related structures are available in a database. This includes: adjusting compositional ratios such as excess oxygen or oxygen vacancies, and/or dopants and substitutions.

The following properties were computed:

(A) Stability at a fixed temperature—which may be given by the hull energy; if the value is less than the temperature (times the Boltzmann constant $k_B$), then the material is stable. Alternatively, the stability at a fixed temperature may be computed by the oxygen chemical potential, which can be benchmarked to temperature at a known scale. Only the hull energy was used.

(B) Filtering by atom size, oxidation state, metal-oxygen ratio, crystal structure, space group, elements, etc.

(C) Elemental material cost, per mol or per kg.

Figure 2:
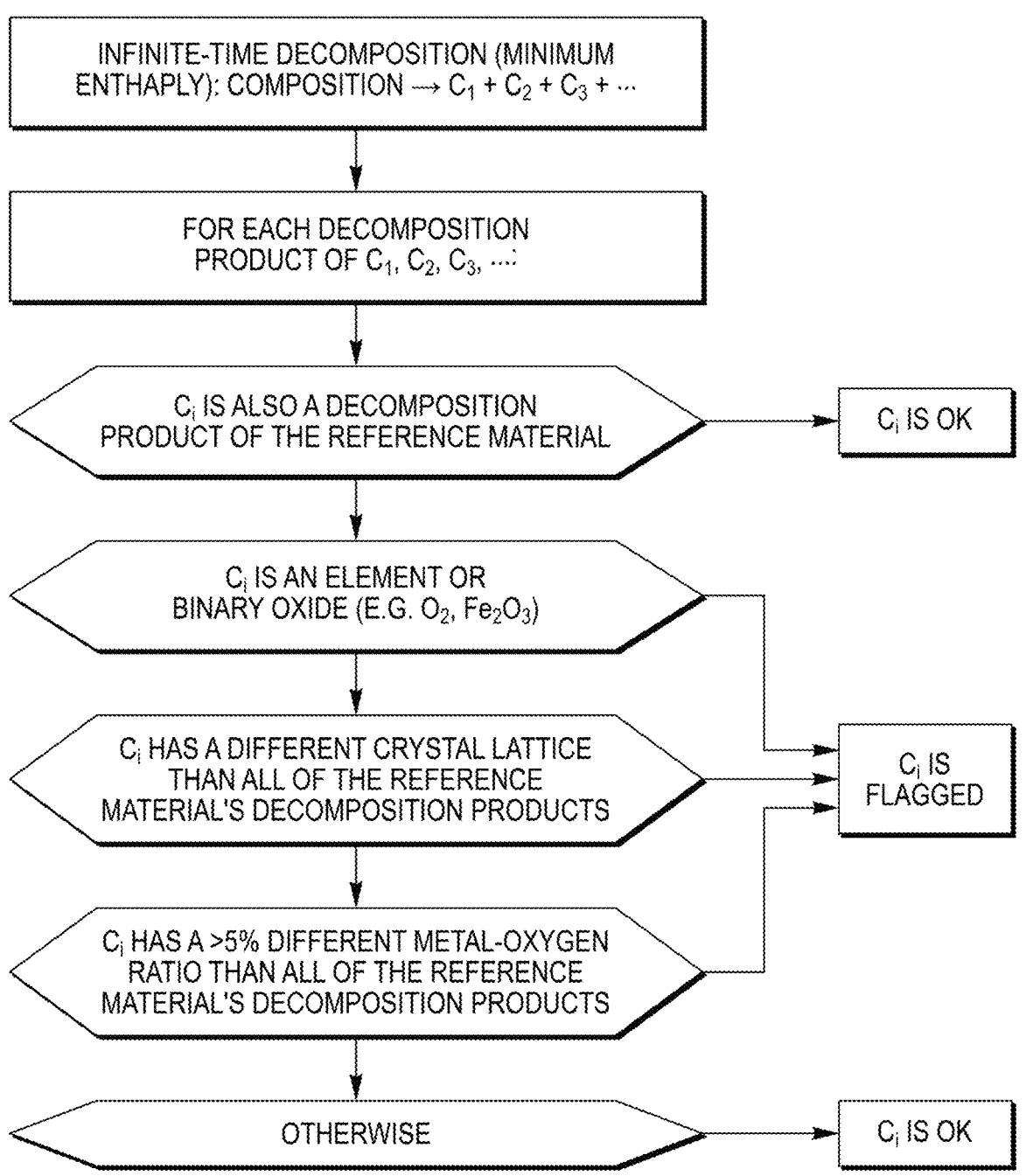
FIG. 2 shows an example algorithm for stability screening of decomposition products.

(D) Compositional stability, which is defined such that a composition C has no decomposition products that are "red-flag" products. It is not reasonable to set the criterion that there are no decomposition products because many materials are commonly used that have a nonzero decomposition energy. Rather, we evaluated decomposition products based on a reference material. One algorithm to screen decomposition products is shown in FIG. 2. The total fractional weight of flagged products $C_i$ is summed and used as a metric for instability.

Figures 3A, 3B, 3C, 4A, 4B, 4C:
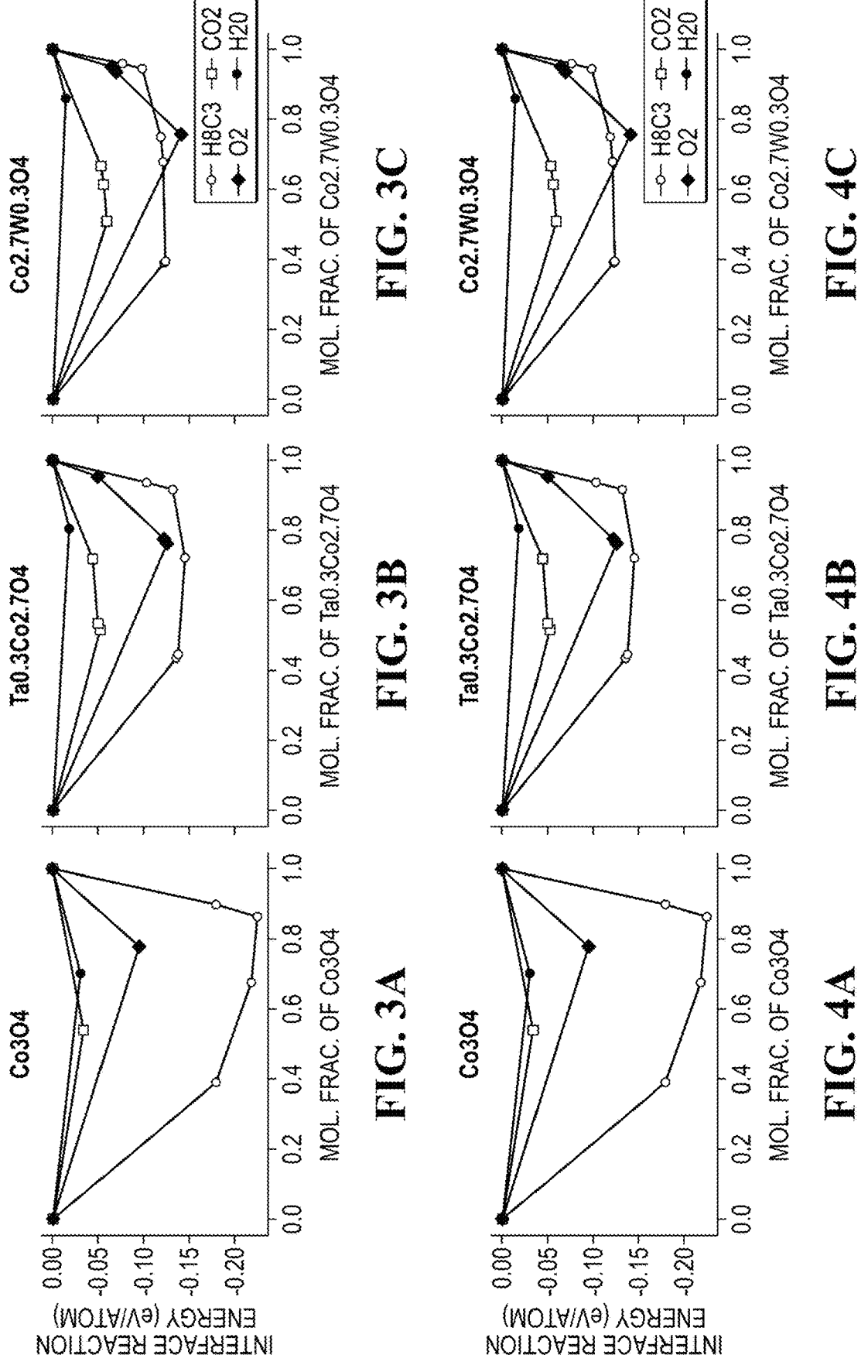
FIGS. 3A-3C show plots of relative reaction energy ε(x) for several non-limiting examples of the material disclosed herein and the reference material $Co_3O_4$.
FIGS. 4A-4I show plots of material reactivity evaluation for non-limiting examples of the material disclosed herein, relative to the reference materials of $Co_3O_4$ and $RuO_2$, respectively.
Figures 4D, 4E, 4F, 4G, 4H, 4I:
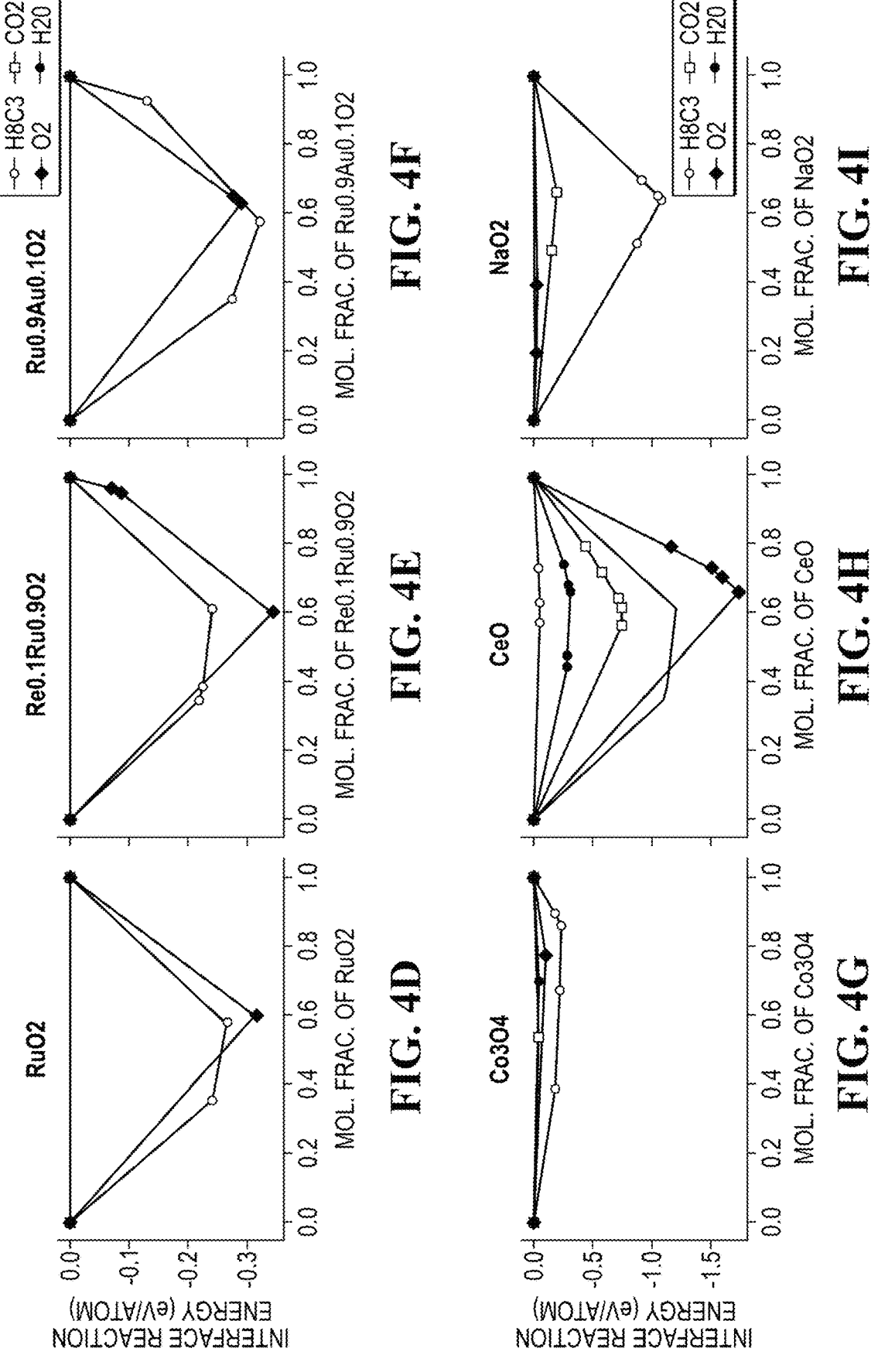

(E) A reactivity screening, which is the likelihood of a reactivity between the composition C and a reactant R, was conducted. Using the convex-hull methodology, the reactivity was computed by examining (1) the decomposition products of a composition C+x R and (2) the relative decomposition energy of $\varepsilon(x)$=E(C+x R)–E(C)–x E(R) (a nonpositive number). The latter is demonstrated in the FIGS. 3A-3C. The most stable reaction is the one that has the minimum $\varepsilon$ while the dilute limit is the lowest value of x that has a nonzero $\varepsilon$.

Using this approach, the reactivity may be benchmarked to some known material C' using the following two quantities:

(I) At which molar fraction x does the reaction occur? A higher reactivity is associated with a higher value of x, i.e., more of the reaction occurs per molar unit of C (or C'). A typical metric is: $RR_{stoich}$=$x_C$/$x_{C'}$, where C' is the reference material and RR stands for the relative reactivity.

(II) What is the relative decomposition energy $\varepsilon$? A higher reactivity is associated with a lower value of $\varepsilon$ (higher absolute value), i.e., the reaction is more energetically favorable. A typical metric here is: $RR_{en}$=$\varepsilon_C$/$\varepsilon_{C'}$, where C' is the reference material. It can also be: $RR_{en}$=($\varepsilon_C$–$\varepsilon_C$)/$k_B$T, where $k_B$ is the Boltzmann constant and T is the absolute temperature. The latter was used, where T is room temperature.

Table 3 below demonstrates non-limiting examples of chemical reactivity, reaction, stoichiometric fraction, and relative decomposition energy for various materials.

TABLE 3

Chemical reactivity, reaction, stoichiometric fraction,
and relative decomposition energy for various materials

| Reactant | Material | Most Stable rxn (minimum of figure) | MS Reactant Ratio (wt) | MS rxn Energy (eV/at) |
|---|---|---|---|---|
| $C_3H_8$ | $Co_3O_4$ | $0.9091\ Co_3O_4 + 0.09091\ H_8C_3 ->0.2727\ CoCO_3 + 0.3636\ H_2O + 2.455\ CoO$ | 0.018 | −0.227 |
| $O_2$ | $Co_3O_4$ | $0.5\ O_2 + 0.5\ Co_3O_4 -> 1.5\ CoO_2$ | 0.133 | −0.096 |
| $CO_2$ | $Co_3O_4$ | $0.3333\ Co_3O_4 + 0.6667\ CO_2 -> 0.3333\ CoO_2 + 0.6667\ CoCO_3$ | 0.366 | −0.034 |
| $H_2O$ | $Co_3O_4$ | $0.5\ H_2O + 0.5\ Co_3O_4 -> CoHO_2 + 0.5\ CoO$ | 0.075 | −0.031 |
| $C_3H_8$ | $Ta_{0.3}Co_{2.7}O_4$ | $0.8075\ Ta_{0.3}Co_{2.7}O_4 + 0.1925\ H8C3 -> 0.1211\ Ta_2CoO_6 + 0.5776\ CoCO_3 + 0.7702\ H_2O + 1.481\ Co$ | 0.038 | −0.146 |
| $C_3H_8$ | $Co_{2.7}W_{0.3}O_4$ | $0.5\ Co_{2.7}W_{0.3}O_4 + 0.5\ H_8C_3 -> 0.15\ Co_3W + 2\ H_2O + 1.5\ C + 0.9\ Co$ | 0.158 | −0.124 |

Various oxide materials were screened based on the following criteria:

(I) For the search spaces A and B, the stability metric described above was used, with the reference materials of $RuO_2$ and $Co_3O_4$, respectively;

(II) Reactivity against $O_2$, $H_2O$, and $CO_2$, where −0.25 (negative) points were given for each reactant for the enthalpic and stoichiometric RR for the most stable reaction, as described above;

(III) Reactivity against $C_3H_3$, where a positive ("good") point was given for enthalpic and stoichiometric metrics RR for the most stable reaction, as described above; and (IV) Cost per kg (elemental material cost).

Under (I), the Search Space A: Because $RuO_2$ is a known catalyst material, a search was conducted for a Ru-based material, in which at least a portion of Ru could be substituted. The goal was at least a 10% Ru substitution such that the search focused on identifying M in $Ru_{0.9}M_{0.1}O_2$, where M is a nonradioactive element and/or metal. The reference material was $RuO_2$. The search revealed 59 materials/compounds.

Search Space B: Because $Co_3O_4$ is a known catalyst material and may be doped with Ni, a search was conducted for $Co_{3-x}M_xO_4$, where x is 0.2 or 0.3 and M is a nonradioactive element and/or metal. The reference material was $Co_3O_4$. The search revealed 117 materials/compounds.

Search Space C: A search was also conducted for binary and ternary oxides $A_{1-x}B_xO_y$, with the restrictions below. These materials tend to be scavenging materials. The reference material was $Co_3O_4$, but a stability analysis was not performed, as the materials are substantially different than the reference materials. The restrictions on the Search Space C were as follows:

i. The hull energy is below 25 meV (300 K);

ii. A, B are not radioactive and are not the following rare, reactive, or undesirable elements: F, Cl, Be, Pb, Hg, He, H, Li, P, S, As, Se, Br, Cd, I, Sb, Te, Pr, Sm, Eu, Gd, Tb, Dy, Ho, Er, Tm, Yb, Lu; and iii. y is between 1 and 3, or the total oxygen content (y/y+1) is between 0.5 and 0.75;

iv. At least one of A and B must be a metal.

Under (II), reactivity screening was evaluated. Several examples of the interfacial reaction energy plots are shown in FIGS. 4A-4I. Several examples of chemical reactivity, reaction, stoichiometric fraction, and relative decomposition energy is further shown in Table 4 below.

TABLE 4

Non-limiting examples of chemical reactivity, reaction, stoichiometric fraction, and
relative decomposition energy for materials identified in the Search Spaces A-C

| Reactant | Material | Most Stable rxn | MS Reactant Ratio (wt) | MS rxn Energy (eV/at) |
|---|---|---|---|---|
| $H_8C_3$ | $Co_3O_4$ | $0.9091\ Co_3O_4 + 0.09091\ H_8C_3 -> 0.2727\ CoCO_3 + 0.3636\ H_2O + 2.455\ CoO$ | 0.018 | −0.227 |
| $O_2$ | $Co_3O_4$ | $0.5\ O_2 + 0.5\ Co_3O_4 -> 1.5\ CoO_2$ | 0.133 | −0.096 |
| $H_8C_3$ | $Nb_{0.3}Co_{2.7}O_4$ | $0.7988\ Nb_{0.3}Co_{2.7}O_4 + 0.2012\ H_8C_3 -> 0.6037\ CoCO_3 + 0.8049\ H_2O + 0.01997\ Nb_{12}O_{29} + 1.553\ Co$ | 0.044 | −0.146 |
| $O_2$ | $Nb_{0.3}Co_{2.7}O_4$ | $0.5181\ O_2 + 0.4819\ Nb_{0.3}Co_{2.7}O_4 -> 0.07229\ Nb_2O_5 + 1.301\ CoO_2$ | 0.137 | −0.130 |
| $H_8C_3$ | $Cs_{0.3}Co_{2.7}O_4$ | $0.8969\ Cs_{0.3}Co_{2.7}O_4 + 0.1031\ H_8C_3 -> 2.381\ CoO + 0.2691\ CsHCO_3 + 0.278\ H_2O + 0.04036\ CoCO_3$ | 0.019 | −0.310 |
| $O_2$ | $Cs_{0.3}Co_{2.7}O_4$ | $0.5\ O_2 + 0.5\ Cs_{0.3}Co_{2.7}O_4 -> 1.35\ CoO_2 + 0.15\ CsO_2$ | 0.122 | −0.083 |
| $H_8C_3$ | $Ta_{0.3}Co_{2.7}O_4$ | $0.8075\ Ta_{0.3}Co_{2.7}O_4 + 0.1925\ H_8C_3 -> 0.1211\ Ta_2CoO_6 + 0.5776\ CoCO_3 + 0.7702\ H_2O + 1.481\ Co$ | 0.038 | −0.146 |
| $O_2$ | $Ta_{0.3}Co_{2.7}O_4$ | $0.5181\ O_2 + 0.4819\ Ta_{0.3}Co_{2.7}O_4 -> 1.301\ CoO_2 + 0.07229\ Ta_2O_5$ | 0.124 | −0.127 |

TABLE 4-continued

Non-limiting examples of chemical reactivity, reaction, stoichiometric fraction, and
relative decomposition energy for materials identified in the Search Spaces A-C

| Reactant | Material | Most Stable rxn | MS Reactant Ratio (wt) | MS rxn Energy (eV/at) |
|---|---|---|---|---|
| $H_8C_3$ | $Co_{2.7}W_{0.3}O_4$ | $0.5\ Co_{2.7}W_{0.3}O_4 + 0.5\ H_8C_3 \rightarrow 0.15$ $Co_3W + 2\ H_2O + 1.5\ C + 0.9\ Co$ | 0.158 | −0.124 |
| $O_2$ | $Co_{2.7}W_{0.3}O_4$ | $0.5349\ O_2 + 0.4651\ Co_{2.7}W_{0.3}O_4 \rightarrow$ $1.256\ CoO_2 + 0.1395\ WO_3$ | 0.132 | −0.141 |
| $H_8C_3$ | $RuO_2$ | $0.8333\ RuO_2 + 0.1667\ H_8C_3 \rightarrow 0.5$ $CO_2 + 0.6667\ H_2O + 0.8333\ Ru$ | 0.066 | −0.265 |
| $O_2$ | $RuO_2$ | $0.5\ O_2 + 0.5\ RuO_2 \rightarrow 0.5\ RuO_4$ | 0.240 | −0.313 |
| $H_8C_3$ | $Na_{0.1}Ru_{0.9}O_2$ | $0.1632\ H_8C_3 + 0.8368\ Na_{0.1}Ru_{0.9}O_2 \rightarrow$ $0.6109\ H_2O + 0.08368\ NaHCO_3 +$ $0.4059\ CO_2 + 0.7531\ Ru$ | 0.069 | −0.317 |
| $O_2$ | $Na_{0.1}Ru_{0.9}O_2$ | $0.4444\ O_2 + 0.5556\ Na_{0.1}Ru_{0.9}O_2 \rightarrow$ $0.02778\ Na_2RuO_4 + 0.4722\ RuO_4$ | 0.204 | −0.273 |
| $H_8C_3$ | $Ru_{0.9}W_{0.1}O_2$ | $0.8547\ Ru_{0.9}W_{0.1}O_2 + 0.1453\ H_8C_3 \rightarrow$ $0.4359\ CO_2 + 0.5812\ H_2O + 0.08547$ $WO_3 + 0.7692\ Ru$ | 0.053 | −0.241 |
| $O_2$ | $Ru_{0.9}W_{0.1}O_2$ | $0.4872\ O_2 + 0.5128\ Ru_{0.9}W_{0.1}O_2 \rightarrow$ $0.4615\ RuO_4 + 0.05128\ WO_3$ | 0.215 | −0.333 |
| $H_8C_3$ | $Re_{0.1}Ru_{0.9}O_2$ | $0.1453\ H_8C_3 + 0.8547\ Re_{0.1}Ru_{0.9}O_2 \rightarrow$ $0.4359\ CO_2 + 0.5812\ H_2O +$ $0.08547\ ReO_3 + 0.7692\ Ru$ | 0.053 | −0.241 |
| $O_2$ | $Re_{0.1}Ru_{0.9}O_2$ | $0.4937\ O_2 + 0.5063\ Re_{0.1}Ru_{0.9}O_2 \rightarrow$ $0.02532\ Re_2O_7 + 0.4557\ RuO_4$ | 0.220 | −0.341 |
| $H_8C_3$ | $Ru_{0.9}Au_{0.1}O_2$ | $0.8333\ Ru_{0.9}Au_{0.1}O_2 + 0.1667\ H_8C_3 \rightarrow$ $0.6667\ H_2O + 0.5\ CO_2 + 0.08333$ $Au + 0.75\ Ru$ | 0.062 | −0.320 |
| $O_2$ | $Ru_{0.9}Au_{0.1}O_2$ | $0.4667\ O_2 + 0.5333\ Ru_{0.9}Au_{0.1}O_2 \rightarrow$ $0.48\ RuO_4 + 0.02667\ Au_2O_3$ | 0.196 | −0.289 |
| $CO_2$ | $Ru_{0.9}Au_{0.1}O_2$ | No reactions found | 0.000 | 0.000 |
| $H_2O$ | $Ru_{0.9}Au_{0.1}O_2$ | No reactions found | 0.000 | 0.000 |

Figure 5:
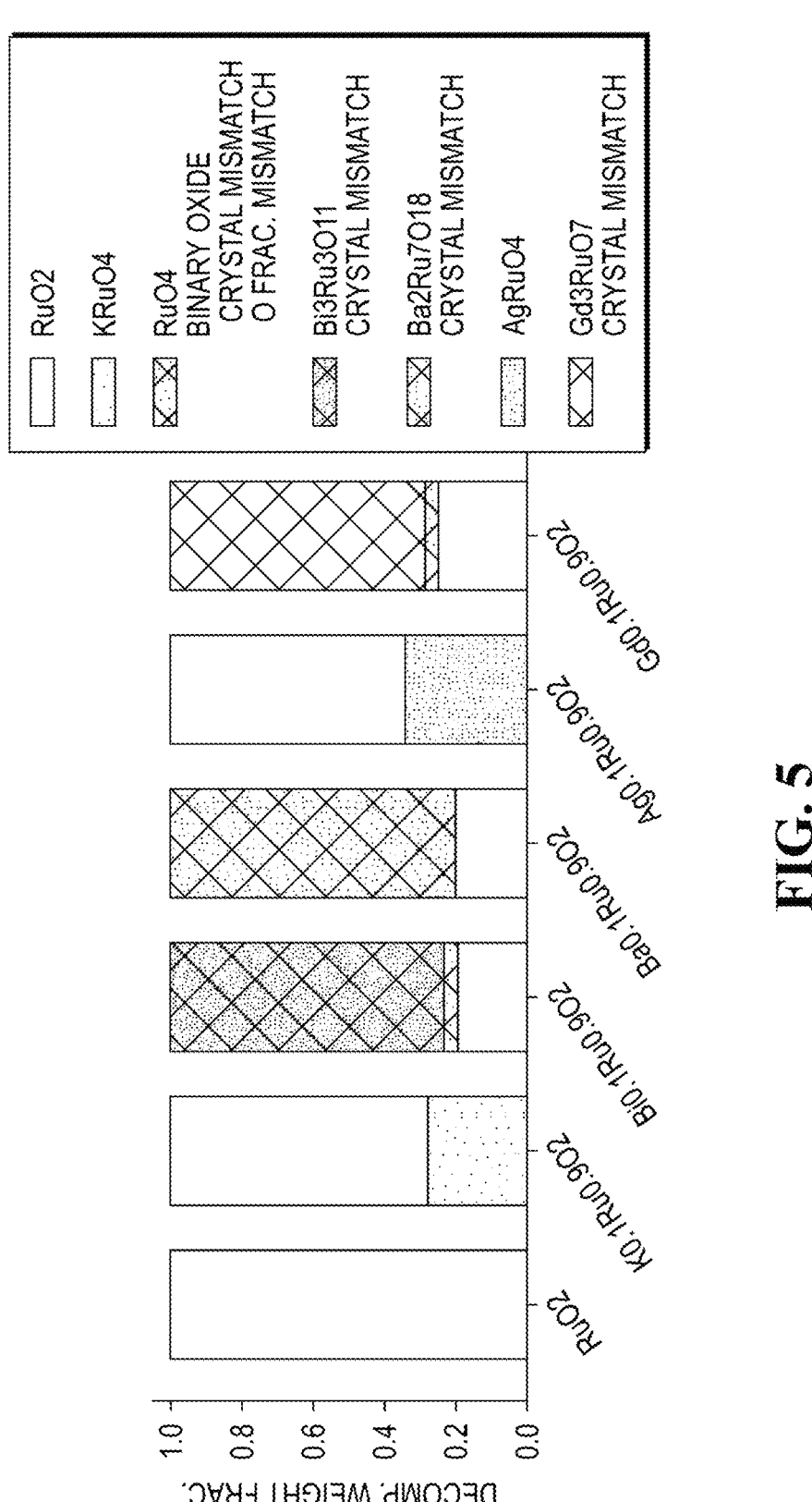
FIG. 5 shows a graph of material stability evaluation, including red-flagged materials marked with x and the reason for red-flagging in the legend.
Figures 6, 7:
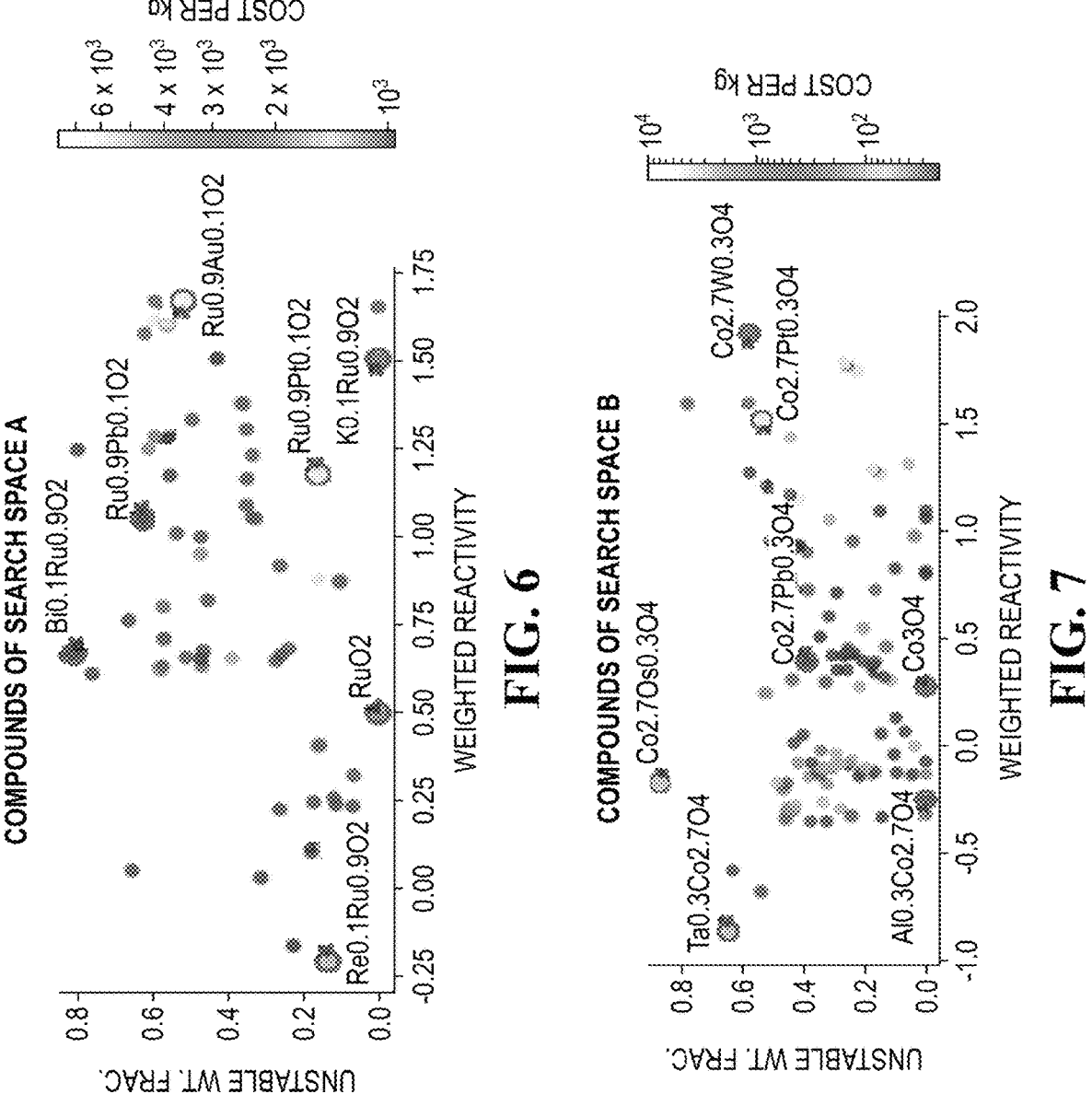
FIG. 6 shows a plot of stability evaluation, weighted reactivity, and cost for the studied materials of Search Space A.
FIG. 7 shows a plot of stability evaluation, weighted reactivity, and cost for the studied materials of Search Space B.
Figure 8:
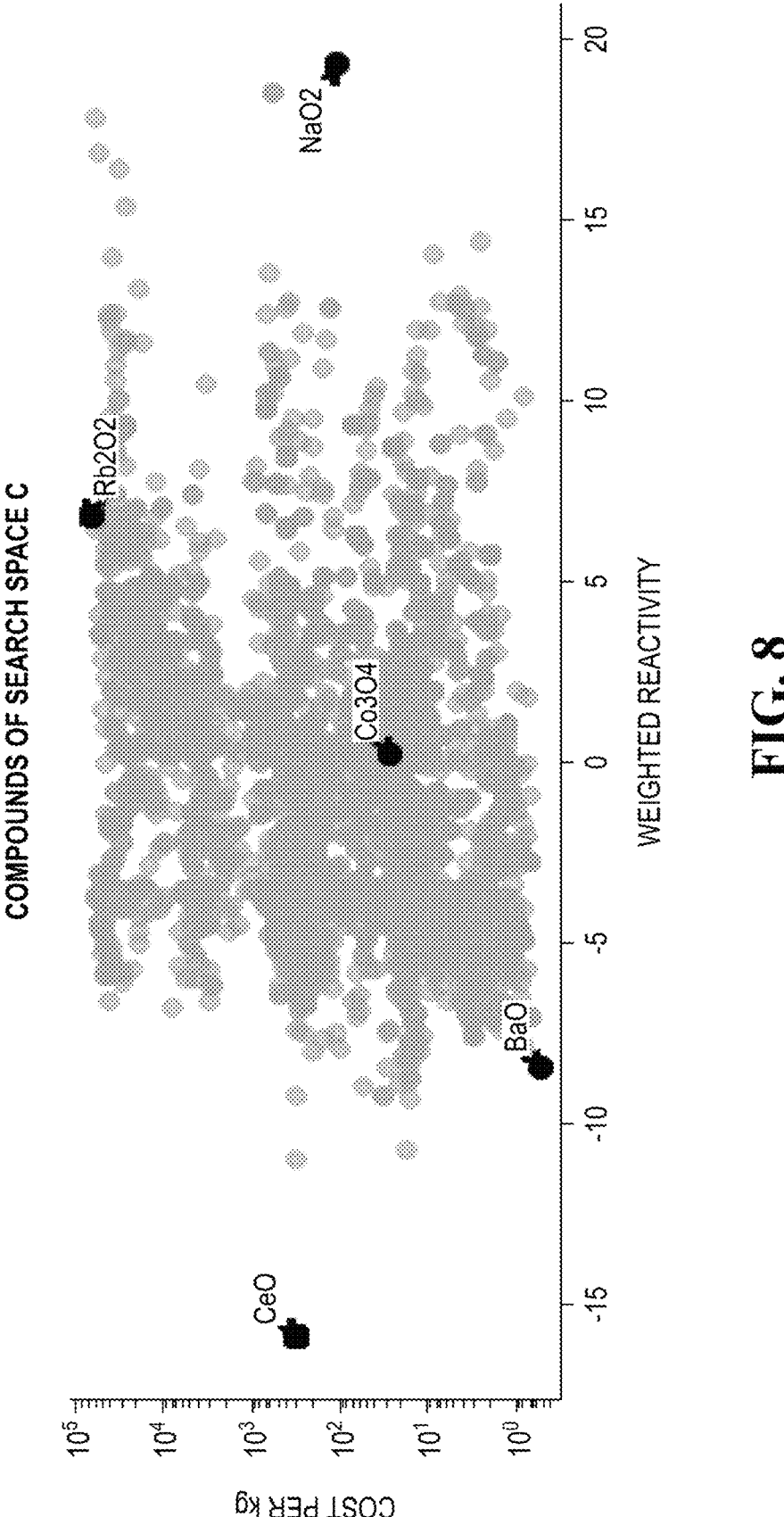
FIG. 8 shows a plot of stability evaluation, weighted reactivity, and cost for the studied materials of Search Space C.

The "weighted reactivity" metric in the tables 6, 7, and 9 and plots of FIGS. 6-8 is given by the weighted sum of the following values, all for the "most stable" reaction (minimum of the interfacial-reactivity plots):

$4\times RR_{stoich}$ for $C_3H_8$ $4\times RR_{en}$ for $C_3H_8$ $1\times RR_{stoich}$ for each of $O_2$, $CO_2$, and $H_2O$ $1\times RR_{en}$ for each of $O_2$, $CO_2$, and $H_2O$ Under (III), stability screening was evaluated. The stability of several example materials are listed in Table 5 and shown in FIG. 5. The weight fraction of unstable materials were summed and used as a metric for stability.

TABLE 5

Stability analysis results for non-limiting examples of materials identified in
the Search Spaces A-C

| Formula | Decomp. Product | Decomp. wt. Frac. | Crystal System | Classification | Oxygen Fraction | Stability |
|---|---|---|---|---|---|---|
| $RuO_2$ | $RuO_2$ | 1.000 | tetragonal | binary oxide | 0.667 | OK |
| $K_{0.1}Ru_{0.9}O_2$ | $KRuO_4$ | 0.277 | tetragonal | ternary oxide | 0.667 | OK |
| $K_{0.1}Ru_{0.9}O_2$ | $RuO_2$ | 0.723 | tetragonal | binary oxide | 0.667 | OK |
| $Ag_{0.1}Ru_{0.9}O_2$ | $AgRuO_4$ | 0.339 | tetragonal | ternary oxide | 0.667 | OK |
| $Ag_{0.1}Ru_{0.9}O_2$ | $RuO_2$ | 0.661 | tetragonal | binary oxide | 0.667 | OK |
| $Ba_{0.1}Ru_{0.9}O_2$ | $Ba_2Ru_7O_{18}$ | 0.796 | triclinic | ternary oxide | 0.667 | crystal mismatch |
| $Ba_{0.1}Ru_{0.9}O_2$ | $RuO_2$ | 0.204 | tetragonal | binary oxide | 0.667 | OK |
| $Gd_{0.1}Ru_{0.9}O_2$ | $Gd_3RuO_7$ | 0.718 | orthorhombic | ternary oxide | 0.636 | crystal mismatch |
| $Gd_{0.1}Ru_{0.9}O_2$ | $RuO_4$ | 0.039 | cubic | binary oxide | 0.800 | binary oxide, crystal mismatch, O frac. mismatch |
| $Gd_{0.1}Ru_{0.9}O_2$ | $RuO_2$ | 0.243 | tetragonal | binary oxide | 0.667 | OK |
| $Bi_{0.1}Ru_{0.9}O_2$ | $Bi_3Ru_3O_{11}$ | 0.773 | cubic | ternary oxide | 0.647 | crystal mismatch |
| $Bi_{0.1}Ru_{0.9}O_2$ | $RuO_4$ | 0.034 | cubic | binary oxide | 0.800 | binary oxide, crystal |

TABLE 5-continued

Stability analysis results for non-limiting examples of materials identified in
the Search Spaces A-C

| Formula | Decomp. Product | Decomp. wt. Frac. | Crystal System | Classification | Oxygen Fraction | Stability |
|---|---|---|---|---|---|---|
| $Bi_{0.1}Ru_{0.9}O_2$ | $RuO_2$ | 0.193 | tetragonal | binary oxide | 0.667 | mismatch, O frac. mismatch OK |

Under (IV), the cost evaluation, and the overall evaluation of identified materials in Search Space A, is summarized in Table 6 and FIG. 6. The listed materials are at least 80% stable by weight (unstable wt. frac. <0.2) and have a weighted reactivity (reacting with $C_3H_8$, but not the other reactants, as defined above) better than $RuO_2$ (reference material).

TABLE 6

Evaluation of non-limiting examples of compounds from
Search Space A against the reference material

| Material | Weighted Reactivity | Unstable wt. frac. | Cost per kg |
|---|---|---|---|
| $Ag_{0.1}Ru_{0.9}O_2$ | 1.654 | 0.000 | 1091.365 |
| $K_{0.1}Ru_{0.9}O_2$ | 1.507 | 0.000 | 1114.947 |
| $Ru_{0.9}Pt_{0.1}O_2$ | 1.178 | 0.159 | 7727.506 |
| $Ir_{0.1}Ru_{0.9}O_2$ | 0.883 | 0.158 | 6645.333 |
| $Ru_{0.9}Rh_{0.1}O_2$ | 0.875 | 0.101 | 2571.654 |
| $RuO_2$ (reference material) | 0.500 | 0.000 | 1148.409 |

Under (IV), the cost evaluation, and the overall evaluation of identified materials in Search Space B is summarized in Table 7 below and FIG. 7. The following materials are at least 90% stable by weight (unstable wt. frac. <0.1) and have a weighted reactivity (reacting with $C_3H_8$, but not the other reactants, as defined above) better than $Co_3O_4$ (reference material). Ni serves as a validation for the method.

TABLE 7

Evaluation of non-limiting examples of compounds from
Search Space B against the reference material

| Material | Weighted Reactivity | Unstable wt. frac. | Cost per kg |
|---|---|---|---|
| $Co_{2.7}Pd_{0.3}O_4$ | 1.281 | 0.056 | 2906.888 |
| $Co_{2.7}Cu_{0.3}O_4$ | 1.065 | 0.000 | 25.209 |
| $Sr_{0.3}Co_{2.7}O_4$ | 1.031 | 0.000 | 23.917 |
| $Co_{2.8}Pd_{0.2}O_4$ | 0.948 | 0.037 | 1983.446 |
| $Co_{2.8}Ni_{0.2}O_4$ | 0.797 | 0.100 | 26.650 |
| $Co_{2.8}Cu_{0.2}O_4$ | 0.786 | 0.000 | 25.902 |
| $Sr_{0.2}Co_{2.8}O_4$ | 0.770 | 0.000 | 25.017 |
| $Co_3O_4$ (reference material) | 0.250 | 0.000 | 27.295 |

In the Search Space C, over 3000 materials were screened. Trends in the top candidates were sought to identify a class of materials that can be used for the catalyst/scavenging/strong oxidizer purpose. Several of the top candidates identified were a set of alkali oxides that can form metal carbonates and act as scavenger materials. These typically have a set of reactions similar to the following, where there is a high enthalpy associated with carbonation of the alkali metal.

It was surprisingly discovered that alkali metals can be used for a scavenging reaction of propane gas while easily forming from carbonates with propane, but less preferentially with carbon dioxide. Example materials are shown in Tables 8 and 9 and FIG. 8.

TABLE 8

Evaluation of non-limiting examples of compounds from Search Space C

| Reactant | Material | Most Stable rxn | MS Reactant Ratio (wt) | MS rxn Energy (eV/at) |
|---|---|---|---|---|
| $H_8C_3$ | $NaO_2$ | 0.8696 $NaO_2$ + 0.1304 $H_8C_3$ –> 0.08696 $NaH_9O_5$ + 0.1304 $H_2O$ + 0.3913 $Na_2CO_3$ | 0.120 | −1.107 |
| $O_2$ | $NaO_2$ | No reactions found | 0.000 | 0.000 |
| $CO_2$ | $NaO_2$ | 0.6667 $NaO_2$ + 0.3333 $CO_2$ –> 0.3333 $Na_2CO_3$ + 0.5 $O_2$ | 0.400 | −0.195 |
| $H_2O$ | $NaO_2$ | 0.6 $H_2O$ + 0.4 $NaO_2$ –> 0.4 $NaH_3O_2$ + 0.3 $O_2$ | 0.491 | −0.024 |
| $H_8C_3$ | $K_3NbO_8$ | 0.7143 $K_3NbO_8$ + 0.2857 $H_8C_3$ –> 0.2857 $K_4H_6C_2O_9$ + 0.2857 $KHCO_3$ + 0.7143 $KNbO_3$ + 0.1429 $H_2O$ | 0.052 | −0.803 |
| $O_2$ | $K_3NbO_8$ | No reactions found | 0.000 | 0.000 |
| $CO_2$ | $K_3NbO_8$ | 0.4615 $K_3NbO_8$ + 0.5385 $CO_2$ –> 0.07692 $K_4Nb_6O_{17}$ + 0.5385 $K_2CO_3$ + 0.9231 $O_2$ | 0.152 | −0.100 |
| $H_2O$ | $K_3NbO_8$ | 0.75 $H_2O$ + 0.25 $K_3NbO_8$ –> 0.5 $KH_3O_2$ + 0.25 $KNbO_3$ + 0.5 $O_2$ | 0.160 | −0.006 |

TABLE 9

Evaluation of non-limiting examples
of compounds from Search Space C

| Compound | Weighted Reactivity | Cost per kg |
|---|---|---|
| $NaO_2$ | 19.309 | 106.266 |
| $KO_2$ | 18.529 | 551.278 |
| $RbO_2$ | 17.786 | 57989.359 |
| $CsO_2$ | 16.864 | 53113.439 |
| $RbYO_2$ | 16.437 | 33201.220 |
| $K_2PtO_6$ | 15.397 | 26301.191 |
| $Rb_2CeO_3$ | 13.922 | 38080.042 |
| $K_3NbO_8$ | 12.722 | 354.331 |
| $K_3TaO_8$ | 12.581 | 418.720 |
| $Rb_3NbO_8$ | 12.429 | 42818.931 |
| $Rb_3TaO_8$ | 12.409 | 36254.458 |
| $Cs_3TaO_8$ | 11.883 | 37216.754 |
| $KMnO_4$ | 11.869 | 249.127 |
| $RbLaO_2$ | 11.721 | 26759.712 |
| $RbNdO_2$ | 11.636 | 26276.234 |
| $RbMnO_4$ | 11.470 | 33326.195 |
| $CsMnO_4$ | 10.966 | 34779.105 |
| $Na_4(NiO_2)_9$ | 10.361 | 39.575 |
| $KAgO_2$ | 10.217 | 689.667 |
| $NaAgO_2$ | 10.182 | 553.097 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A propane gas-utilizing system comprising:

a housing including propane gas;

a propane leakage prevention material comprising a catalyst, scavenger, and/or oxidizer of the propane gas arranged in the housing and including at least one of (a) an oxide material having at least one composition of formula (I):

$$Ru_{1-x}M_xO_2 \qquad \text{(I)},$$

where:

$0 < x \le 0.1$, and

M is K, Pt, Rh, or Ir, or (b) an oxide material having at least one composition of formula (II):

$$Co_{3-x}M_xO_4 \qquad \text{(II)},$$

where:

$0 < x \le 0.3$, and

M is Pd, Cu, or Sr, or (c) an oxide material having at least one composition of formula (III):

$$MM'_xO_y \qquad \text{(III)},$$

where:

x is a stoichiometric ratio of M' to M, $0 \le x \le 1.5$, y is a stoichiometric ratio of O to M, $1 \le y \le 3$, M is an alkali metal, and M' (if x>0) is Y, Nb, Ta, La, Nd, Ag, or Au, wherein the propane leakage prevention material includes an alkali oxide.

2. The system of claim 1, wherein the material is configured as a coating on at least one surface of the housing.

3. The system of claim 1, wherein the material includes at least one oxide of formula (II) or (III).

4. The system of claim 1, wherein the propane gas-utilizing system is a heat pump.

5. The system of claim 1, wherein the propane leakage prevention material includes the oxide material having at least one composition of formulas (I) and (III).

6. The system of claim 1, wherein the material is structured as a replaceable component of the propane gas-utilizing system.

7. The system of claim 1, wherein the material includes at least one compound of the formula (III), where M' is a transition metal and M is Na, K, Rb, or Cs.

8. The system of claim 1, wherein the catalyst, scavenger, and/or oxidizer includes a mixture of at least one composition of formula (II) and at least one composition of formula (III).

9. The system of claim 1, wherein the propane leakage prevention material is disposed on a lower internal surface of the housing to intercept gravitationally-accumulated propane.

10. A propane gas catalyst comprising:

a mixture of (a) an oxide material having at least one composition of formula (I):

$$Ru_{1-x}M_xO_2 \qquad \text{(I)},$$

where:

$0 < x \le 0.1$, and

M is Ag, K, Pt, Rh, or Ir, or (b) an oxide material having at least one composition of formula (II):

$$Co_{3-x}M_xO_4 \qquad \text{(II)},$$

where:

$0 < x \le 0.3$, and

M is Pd, Cu, or Sr, and (c) an oxide material having at least one composition of formula (III):

$$MM'_xO_y \qquad \text{(III)},$$

where:

x is a stoichiometric ratio of M' to M, $0 \le x \le 1.5$, y is a stoichiometric ratio of O to M, $1 \le y \le 3$, M is Na, K, Rb, or Cs, and M' (if x>0) is Y, Ce, Nb, Ta, La, Nd, Mn, Ag, Au, or Cr, the catalyst being configured to increase a rate of propane gas oxidation without being consumed in the reaction.

11. The catalyst of claim 10, wherein the catalyst is a heat pump system propane gas catalyst.

12. The catalyst of claim 11, wherein the catalyst is a replaceable component of the heat pump system.

13. The catalyst of claim 10, wherein the catalyst forms a nanoparticle layer.

14. The catalyst of claim 10, wherein the catalyst is arranged as a multi-layer coating.

15. The catalyst of claim 14, wherein each layer of the multi-layer coating includes one or more compounds of the same formula (I), (II), or (III).

16. The catalyst of claim 10, wherein the catalyst includes at least one compound of the formula (III), where M' is a transition metal.

17. The catalyst of claim 10, wherein the catalyst includes a mixture of compounds of the formulas (II) and (III).

18. The catalyst of claim 10, wherein the mixture comprises (a) an oxide material having at least one composition of formula (I):

$$Ru_{1-x}M_xO_2 \qquad \qquad (I),$$

where:

$0 < x \leq 0.1$, and

M is Ag, K, Pt, Rh, or Ir.

\* \* \* \* \*